Oct. 11, 1960     L. B. SCOTT     2,956,221
ULTRALINEAR TRANSDUCER

Filed March 31, 1958     4 Sheets-Sheet 1

LARKIN B. SCOTT
INVENTOR.

BY *John L. McLaren*

ATTORNEY

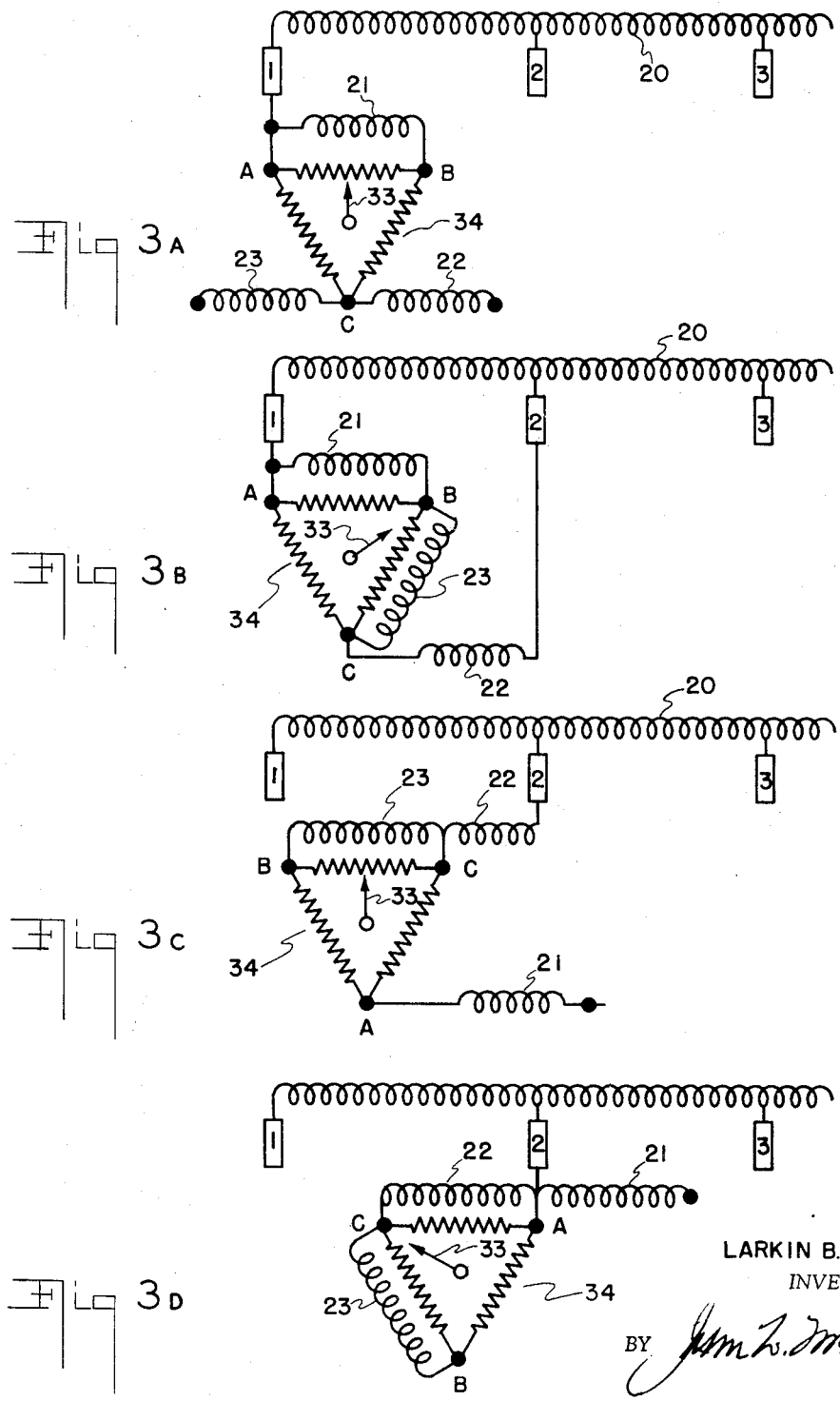

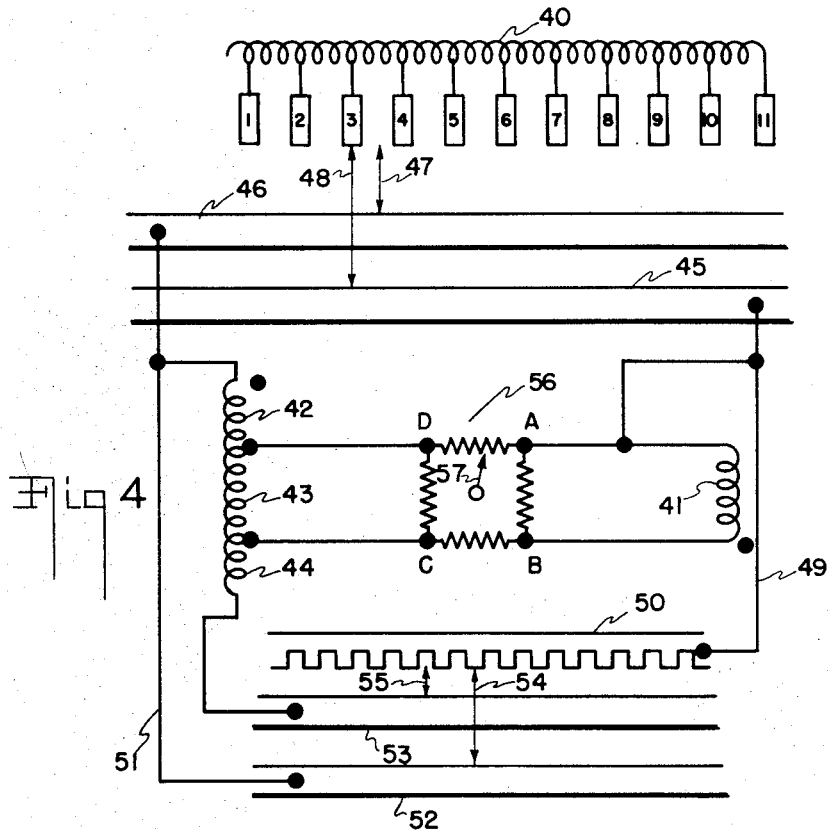
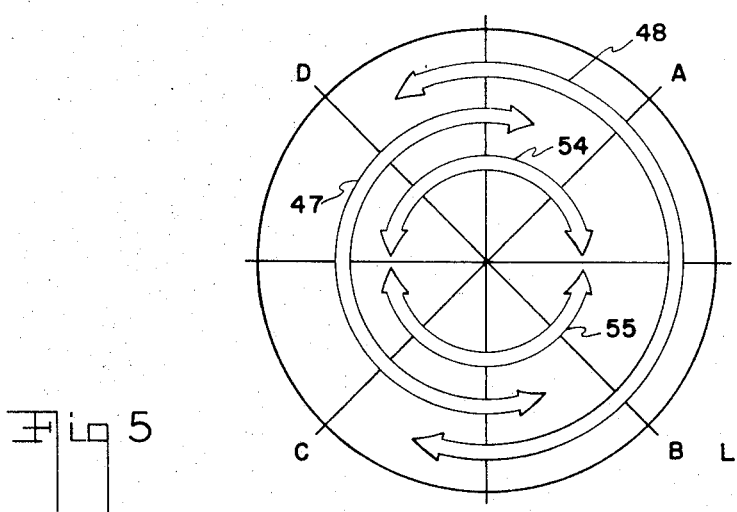
Fig 4
Fig 5
LARKIN B. SCOTT
INVENTOR.

United States Patent Office
2,956,221
Patented Oct. 11, 1960

2,956,221

ULTRALINEAR TRANSDUCER

Larkin B. Scott, Fort Worth, Tex., assignor to The Perkin-Elmer Corporation, Norwalk, Conn., a corporation of New York Filed Mar. 31, 1958, Ser. No. 725,284

6 Claims. (Cl. 323—43.5)

The present invention relates to a novel form of precision transducer capable of producing an electrical output having an extremely high degree of linearity with respect to an analog input to the device. The new apparatus possesses very desirable input-output impedance characteristics as well as extraordinary linearity and precision.

Many prior art devices involved compromises in the interests of practicality and, as a consequence, not infrequently desirable impedance characteristics were sacrificed to a degree in order to increase the output rating of the device or, switching transients were tolerated in order to simplify the implementation of complex switching sequences.

In other prior art devices, the linearity of the output with respect to its analog input depended to a considerable extent on the amount of current drawn from the device. Therefore, relatively high current outputs were only achieved at the sacrifice of linearity. Conversely, a high degree of linearity was only achieved when minimum currents were drawn.

It is the object of the present invention to overcome the deficiencies of prior devices in producing an electrical signal having an extremely high degree of linearity with respect to its analog input.

This is accomplished in a device which inherently has a high input impedance and a low output impedance and is therefore capable of greater current output than is possible with comparable devices. Moreover, the present invention, because of the unique operative coaction of its components, is not subject to switching transients as were prior art devices.

Additionally, the present invention may be embodied in compact, small, ruggedized versions suitable for applications demanding maximum resistance to shock and vibration.

The present invention is basically an alternating current device and comprises an autotransformer having a plurality of taps for developing equal increments of voltage between adjacent taps, at least three inductive elements disposed in magnetic flux linkage relationship with the autotransformer, and a closed loop of distributed impedance tapped at equally spaced points for subdividing the loop into sections equal in number to the several inductive elements. These elements are so interconnected and switched by a switch means synchronously operative with a contact movable along an impedance loop, that the inductive elements are connected hand-over-hand to each other and progressively to autotransformer taps along the series, while adjacent taps of the impedance loop are connected in rotation across the inductive elements so that the contact is at all times operative on an impedance loop section connected to an inductive element energized by conductive connection with a tap of the autotransformer as well as inductive linkage with the core of the autotransformer. In accordance with the concept of the present invention, the several inductive elements are each capable of developing the same amplitude of voltage, the total of which is equal to the voltage increments between adjacent autotransformer taps.

The present invention will be better understood from a description of the embodiments shown in the accompanying drawings and the accompanying explanation of their operation.

In the drawings,

Figs. 3a through 3g are schematic illustrations of the step-by-step sequence of switching functions executed in the operation of the embodiment of Fig. 1;

Fig. 4 is a schematic illustration of another embodiment of the present invention; and Fig. 5 is a schematic illustration of the timed relationship of the switching operations performed in the embodiment of Fig. 4.

Figure 1:
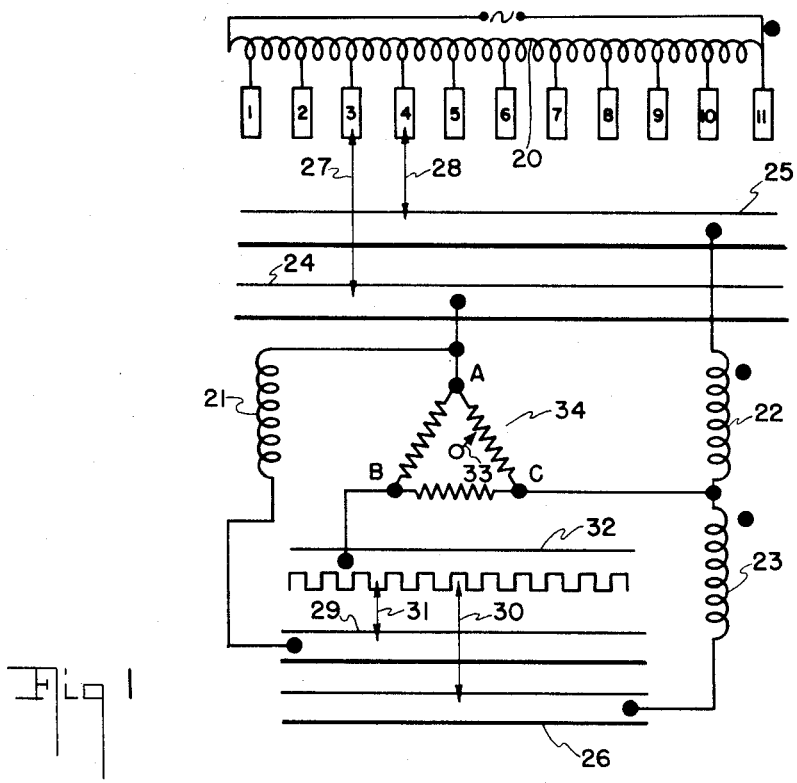
Fig. 1 is a schematic illustration of an embodiment of the present invention.

Fig. 1 illustrates an embodiment of the present invention which comprises an autotransformer 20 having a plurality of equally spaced taps Nos. 1 through 11. Several inductive elements 21, 22, and 23, which must be at least three in number, are disposed and positioned in magnetic flux linkage relationship with autotransformer 20. The present device may be constructed in convenient form by winding the autotransformer on a toroidal core, bringing out the series of equally spaced taps Nos. 1 through 11 to commutator-like contacts. The inductive elements 21, 22 and 23 may be wound on the same toroidal core, each end of the inductive elements having contacts brought out for switching and connection purposes.

In the particular embodiment of Fig. 1, the inductive element 21 is connected to a slip ring 24 while inductive element 22 is connected to a slip ring 25 and inductive element 23 is connected to a slip ring 26. Connectors 27 and 28 are adapted to be movably positioned to connect slip rings 24 and 25 respectively to successive autotransformer taps along the series.

The other end of inductive element 21 is connected to a slip ring 29 and connectors 30 and 31 are adapted to be movably positioned so as to connect the slip rings 26 and 29, respectively, to a commutator means 32. An interpolating contact 33 is operable along the closed impedance loop 34 so as to selectively tap any portion of the voltage developed across any of the sections AB, BC, CA. The output is taken from the interpolating arm 33 and the end of the autotransformer adjacent tap No. 1. In operation, the present invention conceives of impressing a source voltage across the autotransformer 20, dividing the input voltage into an equal number of increments by means of the plurality of taps Nos. 1 through 11 and producing an electrical output precisely proportional to the selected disposition of the interpolating contact 33.

In the particular version of the present invention shown in Fig. 1, the interpolating contactor 33 may be rotated through ten complete revolutions to completely cover its range of operation for selectively interpolating any desired voltage between the extremes impressed across the entire autotransformer 20 at the input terminals of the device. Similarly, if the autotransformer 20 had twenty or thirty taps, the interpolating contactor 33 would be rotatable through twenty or thirty complete revolutions for its full range of operation.

The switching means of the present invention is synchronously operative with movement of the interpolating contactor 33 so that the inductive elements 21, 22, and 23 are connected hand-over-hand to each other and progressively to autotransformer taps Nos. 1 through 11 along the series, all of the inductive elements being serially connected between adjacent taps when switched along the series, and the interpolating contact 33 being at all times movable along an impedance loop section connected across an inductive element energized by conductive connection to a tap of the autotransformer as well as inductive linkage with the autotransformer core.

The mechanism for accomplishing the switching functions of the present invention may be conveniently carried out by an internal-external gear arrangement such as that disclosed in my copending application S.N. 380,-284, now Patent No. 2,843,822, wherein one of the gears is disposed to be eccentrically rotated about a central rotary axis to progressively make connections between the interpolating means and the tape of the autotransformer in the proper sequence. The interpolating contact means of the present invention as well as the closed impedance loop may also be similar to that disclosed and illustrated in said patent, but it is important to note that the operation of the present invention differs from the device disclosed in that copending application in that the tapped sections of the closed impedance loop of the present invention never bridge adjacent autotransformer taps. As will appear from a better understanding of the present invention, there is a point in its operation where the several inductive elements are connected to bridge adjacent autotransformer taps, but at no time is the closed impedance loop or any section of it connected in shunt with adjacent autotransformer taps.

Figure 2:
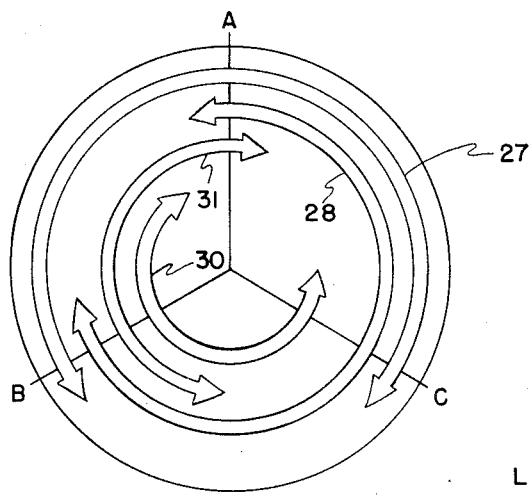
Fig. 2 is a schematic illustration of the timed relationship of the switching operations performed in the embodiment of Fig. 1.

The switching sequences necessary to the proper operation of the present invention are schematically represented in Fig. 2 which illustrates the timed relationships of the switching functions performed by the several connectors 27, 28, 30 and 31 of the embodiment of Fig. 1 relative to the movement of the interpolating contact 33 through a complete revolution. Points A, B, and C of the schematic diagram of Fig. 2 correspond to A, B, and C of the three equally spaced taps on the closed loop of distributive impedance 34. The arcuate symbols numbered 27, 28, 30 and 31 of the schematic diagram correspond to the angular dwell of the similarly numbered contactors 27, 28, 30 and 31 during the periods of their operative connection throughout 360-degree rotary movement of the interpolating contactor 33.

The concept of the present invention requires that the connector 27 be switched from one autotransformer tap to the next between the 120-degree and 240-degree position of the interpolating contactor 33. Assuming counterclockwise rotation of the interpolating contactor 33, the second connector 28 must be switched from one autotransformer tap to the next during the time when the interpolating contactor 33 is rotated from the 0-degree to the 120-degree position. As is also indicated, connectors 27 and 28 must be effectively connected and operatively overlap at or near the point B or 120-degree rotation of the interpolating contactor 33.

Connector 31 must be operative through the sector AB and must also overlap the operation of both connectors 27 and 28 at the point B. Contactor 30 must be operative through the sector BC and must also overlap the operation of contactors 27 and 28 at about the point B. A final requisite of the sequence of switching operations is that connectors 30 and 31 must only have one overlap bracketing the point B, as shown.

The actual step-by-step connections which are consummated by switching means in accordance with the concept of the present invention are represented in a series of illustrations Figs. 3A through 3G. It should be borne in mind that the autotransformer and the separate inductive elements of the present invention are usually formed by being wound about the same toroidal core and are necessarily in magnetic flux linkage with each other. The schematic diagrams as used herein show the windings of the autotransformer and the inductive elements separately for purposes of explanation only and in the interests of clarity.

Fig. 3A shows the interpolating contactor 33 operative along the section AB of the closed impedance loop 34 which is connected in parallel with inductive element 21. The common connection between tap A of the closed impedance loop 34 and the inductive element 21 is connected to tap No. 1 of the autotransformer 20. The inductive element 21, being inductively coupled to the autotransformer 20 has induced in it a voltage which is separate and distinct from the voltage appearing at tap No. 1 of the autotransformer 20, and in accordance with the concept of the present invention, the connections of the inductive element 21 are so arranged that, under the operative condition shown, the voltage developed in the inductive element 21 is additive to that appearing at tap No. 1 of the autotransformer 20. Thus, the interpolating contactor 33, as it moves through its first 120 degrees of operation, taps any desired portion of voltage appearing between taps A and B of the closed impedance loop 34.

In accordance with the concept of the present invention, the maximum voltage appearing at tap B of the present device at the point of its switching operation illustrated in Fig. 3A is one third of the difference in voltage between taps No. 1 and No. 2 of the autotransformer 20.

As the interpolating contactor 33 moves toward point B, a switching operation is completed as illustrated in Fig. 3B. Here, it will be noted that the inductive element 23 has been connected across taps BC of the closed impedance loop 34 while conductive element 22 is connected from tap C of the impedance loop 34 to tap No. 2 of the autotransformer 20. Thus, inductive elements 21, 22 and 23 are serially connected between taps No. 1 and No. 2 of the autotransformer 20. Since each of the inductive elements 21, 22 and 23 develops a voltage equal to one third of that appearing between adjacent autotransformer taps, no switching transient occurs when inductive element 21 is disconnected from autotransformer tap No. 1 as shown in Fig. 3C, the next step in the operation.

The switching operation illustrated in Fig. 3C is accomplished as the interpolating contactor 33 moves through its second 120 degrees of operation. As will be seen in Fig. 3C, one end of the inductive element 22 has been disconnected from autotransformer tap No. 1 and from point B as well, freeing it for further connection in the operation of the device. In Fig. 3C, inductive element 23 remains connected across points BC of the closed impedance loop 34 and inductive element 22 remains connected from point C of the closed impedance loop 34 to tap No. 2 of the autotransformer 20.

In Fig. 3D, point A has been connected to autotransformer tap No. 2 so that inductive element 22 bridges taps A and C of the impedance loop 34 immediately prior to the time that the interpolating contact of 33 becomes operative across the portion CA of the continuous impedance loop 34.

Figure 3E:
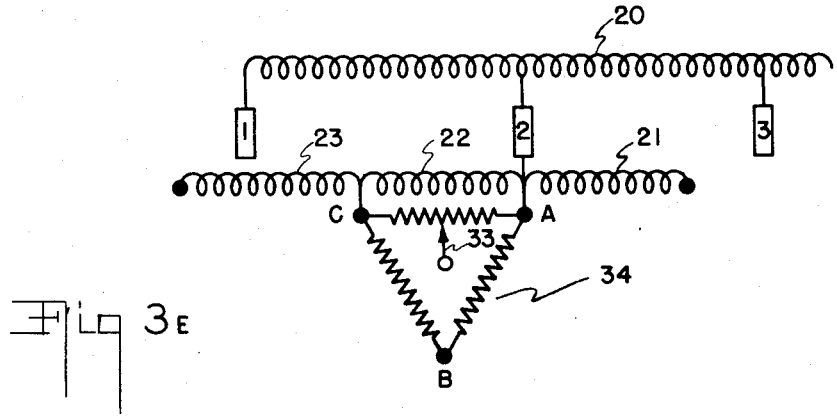

As shown in Fig. 3E, during the movement of interpolating contactor 33 along the section CA of the continuous impedance loop 34, one end of the inductive element 23 is disconnected from tap B of the impedance loop 34, other connections remaining unchanged.

Figure 3F:
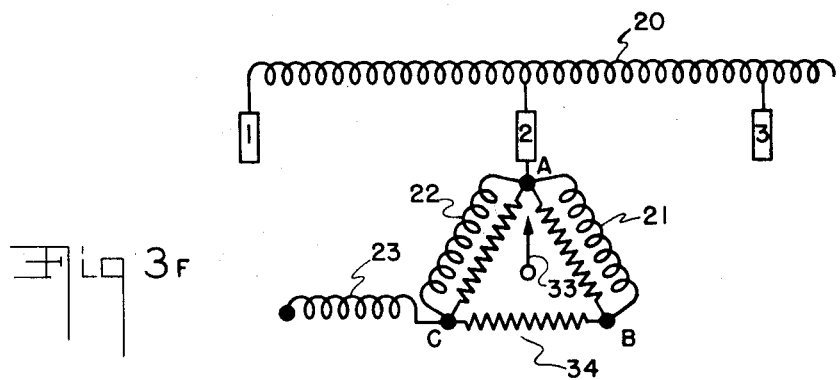

The next switching operation occurs when the movement of the interpolating contactor 33 approaches point A as illustrated in Fig. 3F. The unconnected end of inductive element 21 is connected to tap B of the impedance loop 34, bridging taps A and B of the closed impedance loop 34, the other connections remaining as in Fig. 3E.

Figure 3G:
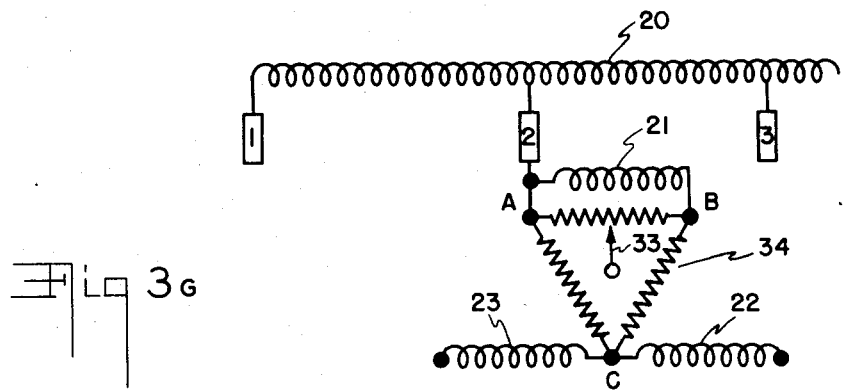

As will appear from Fig. 3G, the final switching operation is consummated as the interpolating contactor 33 again moves along section AB of the continuous impedance loop 34. It will be seen that Fig. 3G corresponds to Fig. 3A except that instead of the combination of components of the present invention being operative between taps No. 1 and No. 2 of the autotransformer, they are now operative between taps No. 2 and No. 3, having completed an entire cycle of operation.

The operation of the embodiment of Fig. 1 between successive pairs of adjacent autotransformer taps No. 2 and No. 3, No. 3 and No. 4, No. 4 and No. 5, etc., is identical to the switching sequence described as taking place between taps No. 1 and No. 2 of the autotransformer 20 and illustrated schematically in Figs. 3A through 3G. It will be evident to those skilled in the art that the three inductive elements 21, 22, and 23 of the embodiment of Fig. 1 need not be permanently connected as, for instance, by the connection between one end of inductive element 21 and tap A of the closed impedance loop 34, or the connection between inductive elements 22, 23 and tap C of the impedance loop. The inductive elements may be entirely separate from each other as illustrated schematically in Figs. 3A through 3G, the requisite of the inventive concept being that the switching operations are carried out in the sequence and manner illustrated by Figs. 3A through 3G.

The schematic drawing of Fig. 4 illustrates a variant embodiment of the present invention. An autotransformer 40 having a plurality of equally spaced taps Nos. 1 through 11 is disposed in magnetic flux linkage relationship with four inductive elements 41, 42, 43 and 44. As has already been explained in connection with the explanation of the embodiment of Fig. 1, the autotransformer of the present device may be wound on a toroidal core, the series of equally spaced taps being brought out to commutator-like contacts. The inductive elements 41, 42, 43 and 44 may be wound on the same toroidal core, each end of the inductive elements having contacts brought out for switching purposes. In accordance with the concept of the present invention, the four inductive elements of Fig. 4 develop a total induced voltage equal to the voltage existing between adjacent taps of the autotransformer 40. Therefore, each of the inductive elements 41, 42, 43 and 44 produce a voltage one quarter that of the existing voltage of the taps of the autotransformer 40.

In the embodiment of Fig. 4, the inductive element 41 has one end connected to a slip ring 45. Inductive elements 42, 43 and 44 are interconnected in series relationship, the other free end of inductive elements 42, 43 and 44 being connected to a slip ring 46. Connectors 47 and 48 are adapted to be movably positioned to connect slip rings 45 and 46, respectively, to successive autotransformer taps along the series. Slip ring 45 is connected through a lead 49 to a commutator 50. Similarly, slip ring 46 is connected through a lead 51 to a slip ring 52. One end of inductive element 44 is connected to a slip ring 53. Connectors 54 and 55 are adapted and arranged to be movably positioned to connect slip rings 52 and 53, respectively, to commutator 50 in sequence and timed relationship as taught by the present invention.

A closed loop of distributed impedance 56 is divided into sections by being tapped at four substantially equally spaced points A, B, C, and D. An adjustable interpolating contact 57 is disposed and arranged to tap any portion of the voltage developed on the impedance loop 56. Tap A of the closed impedance loop is connected to the common connection between inductive element 41 and slip ring 45, while tap B of the closed impedance loop 56 is connected to the other end of inductive element 41. Tap C of the closed impedance loop 56 is connected to the series connection between inductive elements 43 and 44, while tap D is connected to the series connection between inductive elements 42 and 43.

The sequence of switching operations carried out by the operation of the present invention as embodied in the illustration of Fig. 4 is substantially analogous to that described in connection with the explanation of the embodiment of Fig. 3 except that four inductive elements are employed in Fig. 4 instead of three inductive elements utilized in the embodiment of Fig. 3. The required sequence of switching operations and their timed relationships are schematically illustrated by the diagram of Fig. 5. The arcuate symbols Nos. 47, 48, 54 and 55 correspond to the angular dwell of the similarly numbered contactors 47, 48, 54 and 55 during their periods of operative connection throughout 360 degree rotary movement of the interpolating contactor 57.

Thus, it may be seen that the concept of the present invention requires that the dwell of contactors 47 and 48 must overlap within the sector DA and CB. The dwell of contactor 55 must include all the DA sector while the dwell of the contactor 55 must include all the BC sector. However, the dwell of contactors 54 and 55 must not overlap each other. Additionally, the overlap of contactors 47 and 48 must not occur in the gaps between the dwell of contactors 54 and 55.

The sum result of the operation of the embodiment of Fig. 4 as schematically and symbolically illustrated in the diagram of Fig. 5 is that the four inductive elements 41, 42, 43 and 44 are connected hand-over-hand between adjacent taps of the autotransformer 40 progressively along the series and the four sections of the impedance loop are connected in rotation across the four inductive elements. At the same time, the movement of the interpolating contactor 57 is synchronized with the switching operation so that it is operative at all times on an impedance loop section which is connected across an inductive element energized by conductive connection with a tap of the autotransformer as well as its induced energization by reason of its magnetic flux linkage with the core of the autotransformer.

Those skilled in the art will appreciate that the device of the present invention is inherently capable of a much finer degree of linearity than prior art devices. The device disclosed and claimed in my copending application S.N. 380,284 for instance is a high precision, linear device but the present invention, utilizing the same autotransformer and the same interpolating element is inherently capable of three or four times the precision of linearity which may be achieved by the device with my prior invention. While my prior invention connects adjacent taps of the closed impedance loop across taps of an autotransformer in order to interpolate the voltage appearing there, the present device connects three or four inductive elements between adjacent taps of the autotransformer and interpolates the voltage appearing across the inductive elements by connecting adjacent taps of the interpolating impedance across each of the inductive elements in rotation. Therefore, the adjacent taps of the interpolating impedance are connected across one third or one fourth the voltage appearing between adjacent taps of the autotransformer, (depending upon the particular embodiment). Assuming that the same autotransformer and the same interpolating impedance is used in each of the devices, my present invention is necessarily and inherently capable of at least three times the precision of the linearity which was possible with the invention disclosed and claimed in said patent.

Moreover, by the use of the several inductive elements, the interpolating impedance is never connected across the adjacent taps of the autotransformer with the result that current is drawn from the auxiliary inductive elements minimizing adverse loading effects.

Additionally, at the one point in its operation where the present invention has all inductive elements serially connected between adjacent autotransformer taps, the induced voltage in the serially connected inductive elements is exactly that which appears at any comparable point along the autotransformer between the adjacent taps across which the inductive elements are connected. Therefore, when one end of the serially connected inductive elements is disconnected from an autotransformer tap to be connected to another in accordance with the sequence taught by the present invention, there is no switching transient in the output signal of the device because there is no difference in the voltage appearing at that particular inductive element whether it is connected or disconnected.

The above discussion of several of the features and advantages of the present invention is true for both the embodiments of Fig. 3 and Fig. 4 and it will be apparent to those skilled in the art that other embodiments may be readily executed within the teaching of the concept of the present invention, utilizing different numbers of inductive elements and corresponding numbers of taps on the closed loop interpolating impedance.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An electrical apparatus comprising an autotransformer having a series of taps for developing equal increments of voltage, at least three inductive elements disposed in magnetic flux linkage with said autotransformer, said inductive elements developing a total induced voltage equal to said voltage increment between adjacent autotransformer taps, a closed loop of distributed impedance tapped at substantially equally spaced points for subdividing said loop into sections equal in number to said inductive elements, a contact adapted to be positioned by movement along said impedance loop, and switch means responsive to the movement of said contact for connecting said inductive elements hand-over-hand to each other and progressively to autotransformer taps along the series, said switch means being synchronously operative to connect adjacent taps of said impedance loop in rotation across said inductive elements so that said contact is at all times operative on an impedance loop section connected across an inductive element energized by conductive connection with said autotransformer in addition to inductive linkage therewith.

2. An electrical apparatus comprising an autotransformer having a series of taps for developing equal increments of voltage, first, second and third inductive elements disposed in magnetic flux linkage with said autotransformer, each said inductive element developing an induced voltage equal to one third of said autotransformer voltage increment, a closed loop of distributed impedance subdivided into first, second, and third sections by taps at substantially equally spaced points thereon, a contact adapted to be positioned by movement along said impedance loop, and switch means responsive to the movement of said contact for serially connecting said inductive elements hand-over-hand between adjacent taps of the autotransformer, every third such connection being made to an autotransformer tap progressively along the series, said switch means being synchronously operative to connect the first, second and third sections of said impedance loop in rotation across said first, second and third inductive elements respectively so that said contact is at all times operative on an impedance loop section connected across an inductive element energized by conductive connection with said autotransformer in addition to inductive linkage therewith.

3. An electrical apparatus comprising an autotransformer having a series of taps for developing equal increments of voltage, first, second, third and fourth inductive elements disposed in magnetic flux linkage with said autotransformer, each said inductive element developing an induced voltage equal to one fourth of said autotransformer voltage increment, a closed loop of distributed impedance subdivided into first, second, third and fourth sections by taps at substantially equally spaced points thereon, a contact adapted to be positioned by movement along said impedance loop, and switch means responsive to the movement of said contact for serially connecting said inductive elements hand-over-hand between adjacent taps of the autotransformer, every fourth such connection being made to an autotransformer tap progressively along the series, said switch means being synchronously operative to connect the first, second, third and fourth sections of said impedance loop in rotation across said first, second, third and fourth inductive elements, respectively, so that said contact is at all times operative on an impedance loop section connected across an inductive element energized by conductive connection with said autotransformer in addition to inductive linkage therewith.

4. An electrical apparatus comprising an autotransformer having a series of taps for developing equal increments of voltage, first, second and third inductive elements disposed in magnetic flux linkage with said autotransformer, said second and third elements being interconnected in series relation and each said inductive element developing an induced voltage equal to one third of said autotransformer voltage increment, and a closed loop of distributed impedance subdivided into first, second, and third sections by taps at substantially equally spaced points thereon, one of said impedance loop taps being connected to said first inductive element and another of said impedance loop taps being connected to the series interconnection between said second and third elements, a contact adapted to be positioned by movement along said impedance loop, and switch means responsive to the movement of said contact for connecting said first inductive element hand-over-hand with said serially connected second and third inductive elements, and progressively to autotransformer taps along the series, said switch means being synchronously operative to connect the first, second, and third sections of said impedance loop in rotation across said first, second, and third inductive elements respectively so that said contact is at all times operative on an impedance loop section connected across an inductive element energized by conductive connection with said autotransformer in addition to inductive linkage therewith.

5. An electrical apparatus comprising an autotransformer having a series of taps for developing equal increments of voltage, first, second, third, and fourth inductive elements disposed in magnetic flux linkage with said autotransformer, said second, third and fourth elements being interconnected in series relation, and each said inductive element developing an induced voltage equal to one fourth of said autotransformer voltage increment, a closed loop of distributed impedance subdivided into first, second, and third sections by taps at substantially equally spaced points thereon, two adjacent impedance loop taps connected across said third inductive element and said remaining impedance loop taps being connected across said first inductive element, a contact adapted to be positioned by movement along said impedance loop, and switch means responsive to the movement of said contact for connecting said first inductive element hand-over-hand with said serially connected second, third and fourth inductive elements and progressively to autotransformer taps along the series, said switch means being synchronously operative to connect the first, second, third, and fourth sections of said impedance loop in rotation across said first, second, third, and fourth inductive elements respectively so that said contact is at all times operative on an impedance loop section connected across an inductive element energized by conductive connection with said autotransformer in addition to inductive linkage therewith.

6. An electrical apparatus comprising an autotransformer having a series of taps for developing equal increments of voltage, at least three inductive elements disposed in magnetic flux linkage with said autotransformer, said inductive elements developing a total induced voltage equal to said voltage increment between adjacent autotransformer taps, a closed loop of distributed impedance tapped at substantially equally spaced points for subdividing said loop into sections equal in number to said inductive elements, switch means for connecting adjacent taps of said impedance loop in rotation across said inductive elements and synchronously connecting said inductive elements hand-over-hand to each other, all said inductive elements being serially connected between adjacent taps of said autotransformer when switched progressively along said series, and a contact adapted to be at all times movable along an impedance loop section connected across an inductive element energized by conductive connection with said autotransformer in addition to inductive linkage therewith.

No references cited.